US009769019B2

(12) United States Patent
Maruyama

(10) Patent No.: US 9,769,019 B2
(45) Date of Patent: Sep. 19, 2017

(54) DEVICE MANAGEMENT APPARATUS, DEVICE MANAGEMENT SYSTEM, AND DEVICE MANAGEMENT METHOD

(71) Applicant: Yoshiko Maruyama, Kanagawa (JP)

(72) Inventor: Yoshiko Maruyama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 493 days.

(21) Appl. No.: 14/267,316

(22) Filed: May 1, 2014

(65) Prior Publication Data
US 2014/0337514 A1   Nov. 13, 2014

(30) Foreign Application Priority Data

May 13, 2013 (JP) ................... 2013-101678

(51) Int. Cl.
H04L 12/24 (2006.01)
(52) U.S. Cl.
CPC ................ H04L 41/0816 (2013.01)
(58) Field of Classification Search
CPC .......... H04L 43/0876; H04L 41/0816
USPC ........................................ 709/224
See application file for complete search history.

(56) References Cited

U.S. PATENT DOCUMENTS

2005/0273863 A1* 12/2005 Nakao ................ G03G 15/5091
726/26
2005/0289139 A1* 12/2005 Takashima ....... G11B 20/00086
2006/0268304 A1* 11/2006 Tanaka .................. G06F 3/1204
358/1.13
2007/0086052 A1* 4/2007 Furuya ................... H04L 67/16
358/1.15
2007/0127058 A1* 6/2007 Eldridge ............... G06F 3/1222
358/1.15
2008/0028060 A1* 1/2008 Fukasawa ............. G06F 21/608
709/223
2008/0204796 A1* 8/2008 Kitamura .............. G06F 21/608
358/1.15
2009/0006896 A1* 1/2009 Nakagawa .......... G06F 11/2268
714/37

(Continued)

FOREIGN PATENT DOCUMENTS

JP          2009-193178          8/2009

Primary Examiner — Nicholas Taylor
Assistant Examiner — Chong G Kim
(74) Attorney, Agent, or Firm — Oblon, McClelland, Maier & Neustadt, L.L.P.

(57) ABSTRACT

A device management apparatus is connected to a plurality of devices and a plurality of information processing apparatuses using the devices, through a network. The device management apparatus includes: an obtaining unit that obtains usage amount information about usage amounts from the devices; a calculation unit that calculates unit usage amounts that are usage amounts of the respective devices per unit period, using the usage amount information about the respective devices; an analysis unit that analyzes use of the devices using the unit usage amounts of the respective devices; a change unit that changes allocation of the information processing apparatuses to the devices based on an analysis result in order to equalize use of the devices; and a notification unit that notifies the information processing apparatus for which an allocated device has been changed, of usage information required to use the device.

19 Claims, 14 Drawing Sheets

(56) References Cited

U.S. PATENT DOCUMENTS

| | | | | |
|---|---|---|---|---|
| 2009/0059287 A1* | 3/2009 | Yamada | ............ | H04N 1/00222 358/1.15 |
| 2009/0077165 A1* | 3/2009 | Rhodes | ................. | G06Q 10/06 709/203 |
| 2009/0319643 A1* | 12/2009 | Crisan | ................ | G06F 9/44505 709/221 |
| 2010/0079800 A1* | 4/2010 | Muto | ................ | H04N 1/32106 358/1.15 |
| 2010/0118328 A1* | 5/2010 | Sakuraba | .............. | G06K 15/02 358/1.14 |
| 2010/0208295 A1* | 8/2010 | Sato | ..................... | G06F 3/1285 358/1.15 |
| 2011/0029346 A1* | 2/2011 | Kong | ................. | G06F 3/1203 705/7.38 |
| 2011/0176826 A1* | 7/2011 | Yamamichi | ........ | G03G 15/5004 399/83 |
| 2011/0304878 A1* | 12/2011 | Yanazume | ............ | G06F 3/1211 358/1.15 |
| 2012/0042065 A1* | 2/2012 | Takahashi | ............. | G06F 3/1203 709/224 |
| 2012/0069369 A1* | 3/2012 | Hagiwara | .............. | G06Q 10/06 358/1.13 |
| 2012/0140285 A1* | 6/2012 | Kamath | ................ | G06F 3/1204 358/1.15 |
| 2013/0057882 A1* | 3/2013 | Ohta | ..................... | G06F 9/5011 358/1.9 |
| 2013/0057900 A1* | 3/2013 | Ohta | ..................... | G06K 15/00 358/1.14 |
| 2013/0057917 A1* | 3/2013 | Ohta | ........................ | G06F 3/12 358/1.15 |
| 2014/0139871 A1* | 5/2014 | Igarashi | ............. | H04N 1/00344 358/1.15 |
| 2014/0320891 A1* | 10/2014 | Kato | ..................... | G06F 3/126 358/1.15 |

\* cited by examiner

FIG.3

| IMAGE FORMING DEVICE IDENTIFICATION INFORMATION | CONTRACTUAL UNIT USAGE AMOUNT |
|---|---|
| A | 6000 SHEETS |
| B | 7000 SHEETS |
| C | 6000 SHEETS |
| ⋮ | ⋮ |

FIG.4

| IMAGE FORMING DEVICE IDENTIFICATION INFORMATION | PERFORMANCE VALUE |
|---|---|
| A | 40 ppm |
| B | 50 ppm |
| C | 40 ppm |
| ⋮ | ⋮ |

FIG.5

| TERMINAL IDENTIFICATION INFORMATION | IMAGE FORMING DEVICE IDENTIFICATION INFORMATION | ALLOCATION CHANGE FLAG | PREVIOUS IMAGE FORMING DEVICE IDENTIFICATION INFORMATION |
|---|---|---|---|
| A | A | 0 | - |
| B | A | 0 | - |
| C | A | 0 | - |
| D | B | 0 | - |
| E | B | 0 | - |
| F | B | 0 | - |
| G | B | 0 | - |
| H | C | 0 | - |
| I | C | 0 | - |
| J | C | 0 | - |
| ⋮ | ⋮ | ⋮ | ⋮ |

FIG.6

| TERMINAL IDENTIFICATION INFORMATION | IMAGE FORMING DEVICE IDENTIFICATION INFORMATION | ALLOCATION CHANGE FLAG | PREVIOUS IMAGE FORMING DEVICE IDENTIFICATION INFORMATION |
|---|---|---|---|
| A | A | 0 | – |
| B | A | 0 | – |
| C | A | 0 | – |
| D | B | 0 | – |
| E | B | 0 | – |
| F | B | 0 | – |
| G | B | 0 | – |
| H | B | 1 | C |
| I | C | 0 | – |
| J | C | 0 | – |
| ⋮ | ⋮ | ⋮ | ⋮ |

# DEVICE MANAGEMENT APPARATUS, DEVICE MANAGEMENT SYSTEM, AND DEVICE MANAGEMENT METHOD

CROSS-REFERENCE TO RELATED APPLICATIONS

The present application claims priority to and incorporates by reference the entire contents of Japanese Patent Application No. 2013-101678 filed in Japan on May 13, 2013.

BACKGROUND OF THE INVENTION

1. Field of the Invention

The present invention relates to a device management apparatus, a device management system, and a device management method.

2. Description of the Related Art

A device management apparatus that manages devices connected through a network is known so far. For example, Japanese Patent Application Laid-open No. 2009-193178 discloses a technique that optimally places the devices on the network in light of total cost of ownership (TCO) reduction.

However, it is possible in the technique in the past that the devices are not evenly used and only some of the devices are used. This tends to cause failures on only some of the devices. Thus, there is a risk of reduction in the availability.

In light of the foregoing, there is a need to provide a device management apparatus, a device management system, and a device management method that can improve the availability.

SUMMARY OF THE INVENTION

It is an object of the present invention to at least partially solve the problems in the conventional technology.

A device management apparatus is connected to a plurality of devices and a plurality of information processing apparatuses using the devices, through a network. The device management apparatus includes: an obtaining unit that obtains usage amount information about usage amounts from the devices; a calculation unit that calculates unit usage amounts that are usage amounts of the respective devices per unit period, using the usage amount information about the respective devices; an analysis unit that analyzes use of the devices using the unit usage amounts of the respective devices; a change unit that changes allocation of the information processing apparatuses to the devices based on an analysis result in order to equalize use of the devices; and a notification unit that notifies the information processing apparatus for which an allocated device has been changed, of usage information required to use the device.

A device management system includes: a plurality of devices; a plurality of information processing apparatuses using the devices; and a device management apparatus connected to the devices and the information processing apparatuses through a network. The device management apparatus includes: an obtaining unit that obtains usage amount information about usage amounts from the devices; a calculation unit that calculates unit usage amounts that are usage amounts of the respective devices per unit period, using the usage amount information about the respective devices; an analysis unit that analyzes use of the devices using the unit usage amounts of the respective devices; a change unit that changes allocation of the information processing apparatuses to the devices based on an analysis result in order to equalize use of the devices; and a notification unit that notifies the information processing apparatus for which an allocated device has been changed, of usage information required to use the device. Each of the information processing apparatuses includes a usage setting unit that configures a setting for use of an allocated device based on the notified usage information.

A device management method is performed in a device management system comprising. The device management method includes: obtaining usage amount information about usage amounts from devices; calculating unit usage amounts that are usage amounts of the respective devices per unit period, using the usage amount information about the respective devices; analyzing use of the devices using the unit usage amounts of the respective devices; changing allocation of information processing apparatuses to the devices based on an analysis result in order to equalize use of the devices; notifying an information processing apparatus for which an allocated device has been changed, of usage information required to use the device; and configuring a setting for use of an allocated device based on the notified usage information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an exemplary contractual unit usage amount according to the first embodiment;

FIG. 4 is a diagram of an exemplary performance value according to the first embodiment;

FIG. 5 is a diagram of an exemplary allocation table according to the first embodiment;

FIG. 6 is a diagram of an exemplary allocation table according to the first embodiment;

DETAILED DESCRIPTION OF THE PREFERRED EMBODIMENTS

Hereinafter, the device management apparatus, the device management system, and the device management method according to the present invention will be described in detail with reference to the appended drawings.

First Embodiment

First, the configuration of the device management system in the first embodiment will be described.

Figure 1:
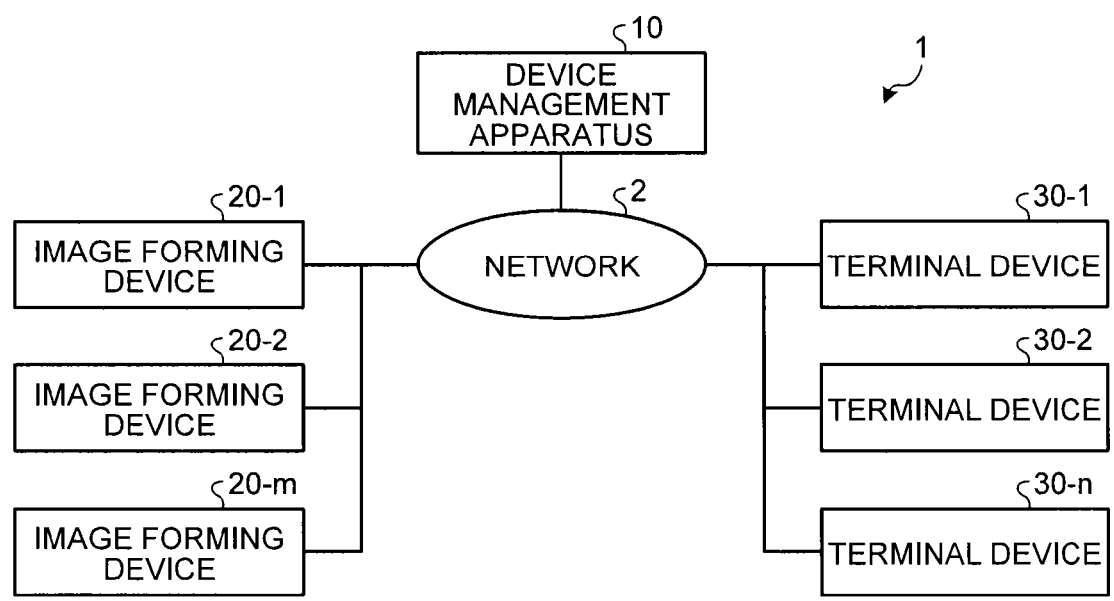
FIG. 1 is a block diagram of an exemplary configuration of a device management system according to a first embodiment.

FIG. 1 is a block diagram of an exemplary configuration of a device management system 1 according to a first embodiment. As illustrated in FIG. 1, the device management system 1 includes a device management apparatus 10, image forming devices 20-1 to 20-m (m is a natural number), and terminal devices 30-1 to 30-n (n is a natural number). The device management apparatus 10, the image forming devices 20-1 to 20-m, and the terminal devices 30-1 to 30-n are connected to each other through a network 2. The network 2 can be implemented, for example, with a local area network (LAN) or the Internet.

The device management apparatus 10 is to manage devices to be managed such as the image forming devices 20-1 to 20-m and the terminal devices 30-1 to 30-n. The device management apparatus 10 can be implemented, for example, with a computer on which a device management program is installed.

The image forming devices 20-1 to 20-m (an example of a plurality of devices) are, for example, a printer, a copier, a multifunction peripheral, a scanner device, or a facsimile machine. The multifunction peripheral (MFP) includes at least two functions among a copying function, a printing function, a scanning function, and a facsimile function.

The terminal devices 30-1 to 30-n (an example of a plurality of information processing apparatuses) use the image forming devices 20-1 to 20-m and, in particular, cause the image forming devices 20-1 to 20-m to perform a printing operation. The terminal devices 30-1 to 30-n can be implemented, for example, with a personal computer (PC) or a tablet.

Note that, when it is not necessary to distinguish the image forming devices 20-1 to 20-m from each other, the image forming devices 20-1 to 20-m will sometimes merely be referred to as an image forming device 20 hereinafter. When it is not necessary to distinguish the terminal devices 30-1 to 30-n from each other, the terminal devices 30-1 to 30-n will sometimes merely be referred to as a terminal device 30 hereinafter.

Figure 2:
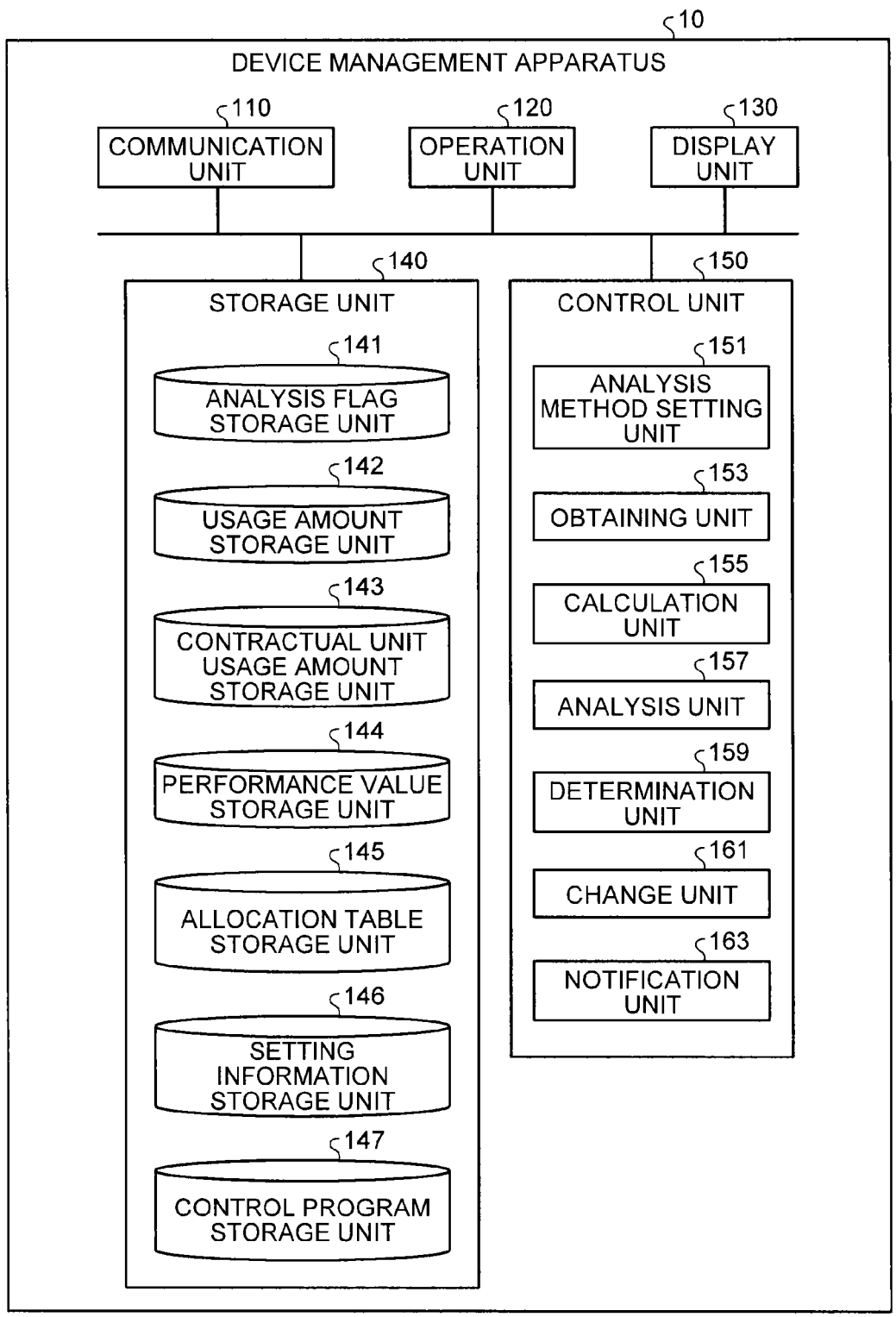
FIG. 2 is a block diagram of an exemplary configuration of a device management apparatus according to the first embodiment.

FIG. 2 is a block diagram of an exemplary configuration of the device management apparatus 10 according to the first embodiment. As illustrated in FIG. 2, the device management apparatus 10 includes a communication unit 110, an operation unit 120, a display unit 130, a storage unit 140, and the control unit 150.

The communication unit 110 is to communicate with external devices such as the image forming device 20 and the terminal device 30 through the network 2. The communication unit 110 can be implemented, for example, with a communication device such as a network interface card (NIC).

The operation unit 120 is to input various operations. The operation unit 120 can be implemented, for example, with an input device such as a keyboard, a mouse, a touch pad, or a touch panel.

The display unit 130 is to display various screens. The display unit 130 can be implemented, for example, with a display device such as a liquid crystal display or a touch panel display.

The storage unit 140 is to store various programs including a device management program executed in the device management apparatus 10, and data used for the various processes performed in the device management apparatus 10. The storage unit 140 can be implemented, for example, with a storage device capable of magnetically, optically, or electrically storing a program or data, such as a hard disk drive (HDD), a solid state drive (SSD), a memory card, an optical disk, a read only memory (ROM), or a random access memory (RAM).

The storage unit 140 includes an analysis flag storage unit 141, a usage amount storage unit 142, a contractual unit usage amount storage unit 143, a performance value storage unit 144, an allocation table storage unit 145, a setting information storage unit 146, and a control program storage unit 147. Note that the analysis flag storage unit 141, the usage amount storage unit 142, the contractual unit usage amount storage unit 143, the performance value storage unit 144, the allocation table storage unit 145, the setting information storage unit 146, and the control program storage unit 147 will be described in detail below.

The control unit 150 is to control each unit in the device management apparatus 10. The control unit 150 can be implemented, for example, with a control device such as a central processing unit (CPU). The control unit 150 includes an analysis method setting unit 151, an obtaining unit 153, a calculation unit 155, an analysis unit 157, a determination unit 159, a change unit 161, and a notification unit 163. The control unit 150 implements the analysis method setting unit 151, the obtaining unit 153, the calculation unit 155, the analysis unit 157, the determination unit 159, the change unit 161, and the notification unit 163 as software by starting (executing) the device management program stored in the storage unit 140.

The analysis flag storage unit 141 will be described hereinafter. The analysis flag storage unit 141 stores an analysis flag indicating an analysis method for analyzing the use of the image forming device 20 and used in the analysis unit 157 to be described below.

The analysis method setting unit 151 sets an analysis method from among a plurality of analysis methods for analyzing the use of the image forming device 20. Specifically, the analysis method setting unit 151 sets one of first to third analysis methods based on the input from the operation unit 120, and updates the analysis flag stored in the analysis flag storage unit 141 such that the analysis flag indicates the set analysis method.

Note that the first analysis method uses an average unit usage amount that is the average of unit usage amounts that are the usage amounts of image forming devices 20-1 to 20-m per unit period. The second analysis method uses the contractual unit usage amounts that are usage amounts per unit period determined in the contract for the respective image forming devices 20-1 to 20-m. The third analysis method uses an average operation rate that is the average of operation rates of the image forming devices 20-1 to 20-m.

The obtaining unit 153 obtains the usage amount information about the usage amount from the image forming device 20. Specifically, the obtaining unit 153 periodically obtains the usage amount information together with the image forming device identification information identifying the image forming device 20 from each of the image forming devices 20-1 to 20-m to store the obtained image forming device identification information and the usage amount indicated by the usage amount information in the usage amount storage unit 142 to link them to each other. The usage amount information can be any type of information about the usage amount of the image forming device 20, and is a counter value indicating the number of printed sheets in the present embodiment. However, it is not limited thereto.

The calculation unit 155 calculates the unit usage amounts of the respective image forming devices 20, using the usage amount information about the respective image forming devices 20. Specifically, the calculation unit 155 calculates the unit usage amounts of the respective image forming devices 20 indicated by respective pieces of the image forming device identification information stored in the usage amount storage unit 142 using respective pieces of the usage amount information linked to the respective pieces of the image forming device identification information.

The analysis unit 157 analyzes the use of the image forming devices 20, using the unit usage amounts of the respective image forming devices 20 based on the analysis method set by the analysis method setting unit 151, in other words, the analysis method indicated by the analysis flag stored in the analysis flag storage unit 141.

When the analysis method setting unit 151 has set the first analysis method as the analysis method, the analysis unit 157 calculates the average unit usage amount from the unit usage amounts of the image forming devices 20-1 to 20-m to calculate the absolute values of the differences of the unit usage amounts of the respective image forming devices 20 from the average unit usage amount.

The contractual unit usage amount storage unit 143 will be described hereinafter. The contractual unit usage amount storage unit 143 stores the contractual unit usage amounts determined in the contract for the respective image forming devices 20. FIG. 3 is a diagram of an exemplary contractual unit usage amount according to the first embodiment. In the example in FIG. 3, the contractual unit usage amount storage unit 143 stores the contractual unit usage amount to link the contractual unit usage amount to the image forming device identification information about the image forming device 20.

When the analysis method setting unit 151 has set the second analysis method as the analysis method, the analysis unit 157 obtains the contractual unit usage amounts of the respective image forming devices 20 from the contractual unit usage amount storage unit 143 to calculate the absolute values of the differences of the unit usage amounts from the obtained contractual unit usage amounts of the respective image forming devices 20.

The performance value storage unit 144 will be described hereinafter. The performance value storage unit 144 stores the performance values of the respective image forming devices 20. FIG. 4 is a diagram of an exemplary performance value according to the first embodiment. In the example in FIG. 4, the performance value storage unit 144 stores the performance value to link the performance value to the image forming device identification information about the image forming device 20.

When the analysis method setting unit 151 has set the third analysis method as the analysis method, the analysis unit 157 obtains the performance values of the respective image forming devices 20 from the performance value storage unit 144 to calculate the operation rates using the unit usage amounts and the obtained performance values of the respective image forming devices 20 in order to calculate the average operation rate from the operation rates of the image forming devices 20-1 to 20-m. Then, the analysis unit 157 calculates the absolute values of the differences of the operation rates of the image forming devices 20 from the average operation rate. Note that the operation rate can be obtained as the unit usage amount/the performance value.

The determination unit 159 determines based on the analysis result in the analysis unit 157 whether to change the allocation of the terminal devices 30-1 to 30-n to the image forming devices 20-1 to 20-m.

When the analysis unit 157 has used the first analysis method for the analysis and when at least one of the absolute values of the differences for the image forming devices 20 calculated by the analysis unit 157 is equal to or larger than a first threshold, the determination unit 159 determines that the allocation of the terminal devices 30-1 to 30-n to the image forming devices 20-1 to 20-m is to be changed.

When the analysis unit 157 has used the second analysis method for the analysis and when at least one of the absolute values of the differences for the image forming devices 20 calculated by the analysis unit 157 is equal to or larger than a second threshold, the determination unit 159 determines that the allocation of the terminal devices 30-1 to 30-n to the image forming devices 20-1 to 20-m is to be changed.

When the analysis unit 157 has used the third analysis method for the analysis and when at least one of the absolute values of the differences for the image forming devices 20 calculated by the analysis unit 157 is equal to or larger than a third threshold, the determination unit 159 determines that the allocation of the terminal devices 30-1 to 30-n to the image forming devices 20-1 to 20-m is to be changed.

The allocation table storage unit 145 will be described hereinafter. The allocation table storage unit 145 stores an allocation table indicating the allocation of the image forming devices 20-1 to 20-m and the terminal devices 30-1 to 30-n.

FIG. 5 is a diagram of an exemplary allocation table according to the first embodiment. In the example of FIG. 5, linking the terminal identification information on the terminal device 30 to the image forming device identification information on the image forming device 20 indicates the allocation of the terminal devices 30-1 to 30-n and the image forming devices 20-1 to 20-m. In the example of FIG. 5, the allocation table further links the allocation change flag and the previous image forming device identification information to the terminal identification information on the terminal device 30. The allocation change flag indicates whether the image forming device 20 allocated to the terminal device 30 has been changed. In the example of FIG. 5, "zero" indicates that the allocation has not been changed, and "one" indicates that the allocation has been changed. The previous image forming device identification information indicates the image forming device identification information on the image forming device 20 before the allocation has been changed when the allocation change flag shows "one".

The change unit 161 changes the allocation of the terminal devices 30-1 to 30-n to the image forming devices 20-1 to 20-m based on the analysis result in the analysis unit 157 so as to equalize the use of the image forming devices 20-1 to 20-m. Specifically, when the determination unit 159 has determined that the allocation is to be changed, the change unit 161 changes the allocation of the terminal devices 30-1 to 30-n to the image forming devices 20-1 to 20-m in the allocation table based on the analysis result in the analysis unit 157 so as to equalize the use of the image forming devices 20-1 to 20-*m*.

When the analysis unit 157 has used the first analysis method for the analysis and the determination unit 159 has determined that the allocation is to be changed, the change unit 161 changes the allocation of the terminal devices 30-1 to 30-*n* to the image forming devices 20-1 to 20-*m* such that all the absolute values of the differences for the image forming devices 20 calculated in the analysis unit 157 are smaller than the first threshold. Specifically, the change unit 161 reduces the number of the terminal devices 30 allocated to the image forming device 20 for which the absolute value of the difference is equal to or larger than the first threshold and for which the unit usage amount is larger than the average unit usage amount. The change unit 161 increases the number of the terminal devices 30 allocated to the image forming device 20 for which the absolute value of the difference is equal to or larger than the first threshold and for which the unit usage amount is smaller than the average unit usage amount.

In the example of FIG. 5, for example, it is assumed that the absolute value of the difference for the image forming device identified by the image forming device identification information "B" is equal to or larger than the first threshold and the unit usage amount is smaller than the average unit usage amount, and the absolute value of the difference for the image forming device identified by the image forming device identification information "C" is equal to or larger than the first threshold and the unit usage amount is larger than the average unit usage amount.

On the assumption, the change unit 161 changes, for example, the image forming device identification information "C" linked to the terminal identification information "H", among the terminal identification information "H", "I", and "J" linked to the image forming device identification information "C", to the image forming device identification information "B" in the example of FIG. 5 (see FIG. 6). This can cause the absolute values of the differences for the image forming devices indicated by the image forming device identification information "B" and the image forming device identification information "C" to be smaller than the first threshold. Furthermore, the change unit 161 changes the allocation change flag linked to the terminal identification information "H" to "one" and sets "C" to the previous image forming device identification information linked to the terminal identification information "H" (see FIG. 6).

Note that, when changing the allocation of the terminal devices 30 to the image forming devices 20 for which the absolute value of the difference is equal to or larger than the first threshold, the change unit 161 can determine, based on the average usage amount of the terminal devices 30-1 to 30-*n*, the number of the terminal devices 30 for which allocation is to be changed such that the absolute value of the difference is smaller than the first threshold.

When the analysis unit 157 has used the second analysis method for the analysis and the determination unit 159 has determined that the allocation is to be changed, the change unit 161 changes the allocation of the terminal devices 30-1 to 30-*n* to the image forming devices 20-1 to 20-*m* such that all the absolute values of the differences for the image forming devices 20 calculated in the analysis unit 157 are smaller than the second threshold. Specifically, the change unit 161 reduces the number of the terminal devices 30 allocated to the image forming device 20 for which the absolute value of the difference is equal to or larger than the second threshold and for which the unit usage amount is larger than the contractual unit usage amount. The change unit 161 increases the number of the terminal devices 30 allocated to the image forming device 20 for which the absolute value of the difference is equal to or larger than the second threshold and for which the unit usage amount is smaller than the contractual unit usage amount.

When the analysis unit 157 has used the third analysis method for the analysis and the determination unit 159 has determined that the allocation it to be changed, the change unit 161 changes the allocation of the terminal devices 30-1 to 30-*n* to the image forming devices 20-1 to 20-*m* such that all the absolute values of the differences for the image forming devices 20 calculated in the analysis unit 157 are smaller than the third threshold. Specifically, the change unit 161 reduces the number of the terminal devices 30 allocated to the image forming device 20 for which the absolute value of the difference is equal to or larger than the third threshold and for which the operation rate is larger than the average operation rate. The change unit 161 increases the number of the terminal devices 30 allocated to the image forming device 20 for which the absolute value of the difference is equal to or larger than the third threshold and for which the operation rate is lower than the average operation rate.

The setting information storage unit 146 and the control program storage unit 147 will be described hereinafter.

The setting information storage unit 146 stores the setting information about the settings of the respective image forming devices 20 (in detail, to link the setting information to the image forming device identification information). The setting information is about the setting required for the terminal device 30 to use an image forming device 20. The setting information includes, for example, the IP address of the image forming device 20, the protocol that the image forming device 20 uses for printing, and the port that the image forming device 20 uses for printing.

The control program storage unit 147 stores the control programs to control the respective image forming devices 20 (in detail, to link the control programs to the image forming device identification information). The control program includes, for example, the printer driver program of the image forming device 20.

The notification unit 163 notifies the terminal device 30 for which an allocated image forming device 20 has been changed, of the usage information required to use the image forming device 20. In the first embodiment, based on the fact that the change unit 161 has changed the allocation of the terminal devices 30-1 to 30-*n* to the image forming devices 20-1 to 20-*m*, the notification unit 163 notifies the terminal device 30 for which an allocated image forming device 20 has been changed, of the usage information about the image forming device 20.

Specifically, when the type of the image forming device 20 allocated to the terminal device 30 is identical to the type before the allocation has been changed, the notification unit 163 notifies the terminal device 30 of the setting information about the image forming device 20 as the usage information. When the type of the image forming device 20 allocated to the terminal device 30 is different from the type before the allocation has been changed, the notification unit 163 notifies the terminal device 30 of the setting information about the image forming device 20 and the control program to control the image forming device 20 as the usage information.

To explain in detail, when the change unit 161 has changed the allocation of the terminal devices 30-1 to 30-*n* to the image forming devices 20-1 to 20-*m*, the notification unit 163 searches the allocation table stored in the allocation table storage unit 145 for the allocation change flag showing "one". The notification unit 163 determines whether the type of the image forming device 20 indicated by the image forming device identification information linked to the allocation change flag showing "one" is identical to the type of the image forming device 20 indicated by the previous image forming device identification information linked to the allocation change flag showing "one".

For example, the model of the image forming device 20 can be stored in the setting information storage unit 146 or the control program storage unit 147 with being linked to the image forming device identification information. Alternatively, a model table in which the image forming device identification information is linked to the model information indicating the model can be stored in the storage unit 140. As described above, the notification unit 163 can determine whether the model of the image forming device 20 indicated by the image forming device identification information linked to the allocation change flag showing "one" is identical to the model of the image forming device 20 indicated by the previous image forming device identification information linked to the allocation change flag showing "one".

When the models of both of the image forming devices 20 are identical to each other, the notification unit 163 obtains the setting information about the image forming device 20 for which allocation has been changed (the setting information linked to the image forming device identification information about the image forming device 20 for which allocation has been changed) in order to notify the terminal device 30 indicated by the terminal identification information linked to the allocation change flag showing "one", of the setting information.

On the other hand, when the models of both of the image forming devices 20 are different from each other, the notification unit 163 obtains the control program of the image forming device 20 for which allocation has been changed (the control program linked to the image forming device identification information about the image forming device 20 for which allocation has been changed) from the control program storage unit 147 along with obtaining the setting information about the image forming device 20 for which allocation has been changed (the setting information linked to the image forming device identification information about the image forming device 20 for which allocation has been changed) from the setting information storage unit 146 in order to notify the terminal device 30 indicated by the terminal identification information linked to the allocation change flag showing "one", of the control program and the setting information.

Finally, the notification unit 163 changes the allocation change flag showing "one" to "zero", and deletes the value of the previous image forming device identification information linked to the allocation change flag showing "one" in the allocation table.

Note that the device management apparatus 10 does not have to include all the above-mentioned components as the configuration. The configuration can omit some of the components.

Figure 7:
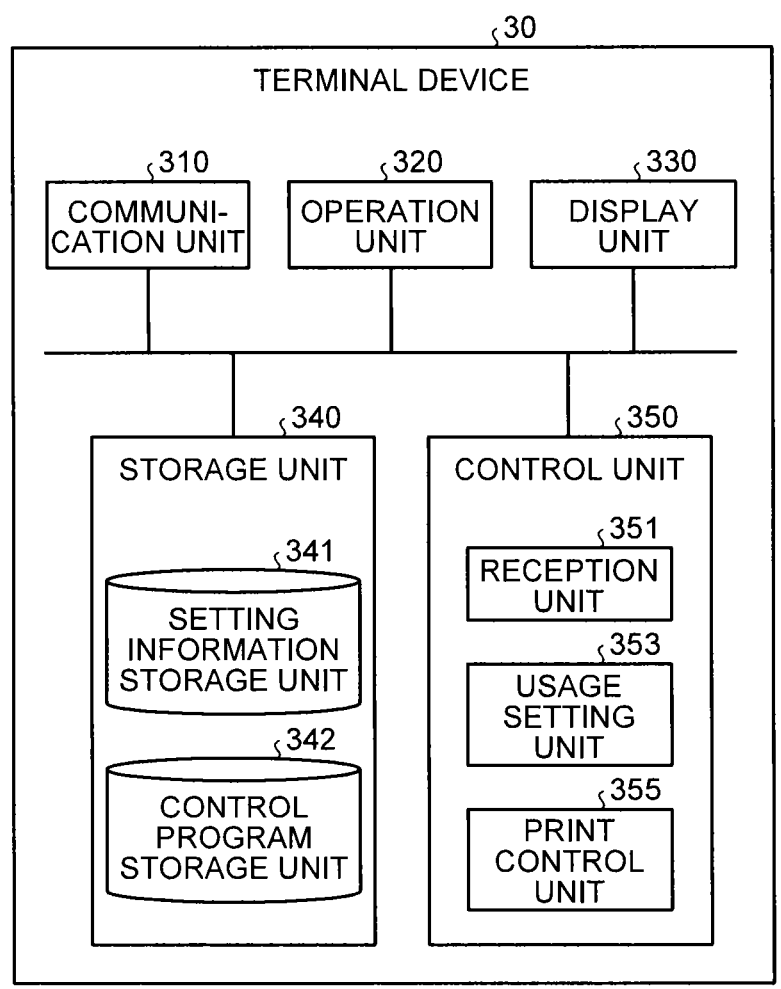
FIG. 7 is a block diagram of an exemplary configuration of a terminal device according to the first embodiment.

FIG. 7 is a block diagram of an exemplary configuration of the terminal device 30 according to the first embodiment. As illustrated in FIG. 7, the terminal device 30 includes a communication unit 310, an operation unit 320, a display unit 330, and a storage unit 340, and a control unit 350.

The communication unit 310 is to communicate with external devices such as the device management apparatus 10 and the image forming device 20 through the network 2.

The communication unit 310 can be implemented, for example, with a communication device such as a network interface card (NIC).

The operation unit 320 is to input various operations. The operation unit 320 can be implemented with an input device such as a keyboard, a mouse, a touch pad, or a touch panel.

The display unit 330 is to display various screens. The display unit 330 can be implemented with a display device such as a liquid crystal display or a touch panel display.

The storage unit 340 is to store, for example, various programs executed in the terminal device 30, and data used for the various processes performed in the terminal device 30. The storage unit 340 can be implemented, for example, with a storage device capable of magnetically, optically, or electrically storing a program or data, such as an HDD, an SSD, a memory card, an optical disk, a ROM, or a RAM.

The storage unit 340 includes a setting information storage unit 341, and a control program storage unit 342.

The setting information storage unit 341 stores the setting information about the image forming device 20 that the terminal device 30 uses, in other words, the image forming device 20 that the device management apparatus 10 allocates to the terminal device 30.

The control program storage unit 342 stores the control program of the image forming device 20 that the terminal device 30 uses, in other words, the image forming device 20 that the device management apparatus 10 allocates to the terminal device 30.

The control unit 350 is to control each unit in the terminal device 30. The control unit 350 can be implemented with a control device such as a CPU. The control unit 350 includes a reception unit 351, a usage setting unit 353, and a print control unit 355. The control unit 350 implements the reception unit 351, the usage setting unit 353, and the print control unit 355 as software by starting (executing) the program stored in the storage unit 340.

The reception unit 351 receives the usage information notified from the device management apparatus 10.

The usage setting unit 353 configures the setting for the use of the image forming device 20 that is allocated to its own device (the terminal device 30) based on the usage information notified from the device management apparatus 10. Specifically, when the reception unit 351 has received the setting information as the usage information, the usage setting unit 353 updates the setting information stored in the setting information storage unit 341 using the received setting information. When the reception unit 351 has received the setting information and the control program as the usage information, the usage setting unit 353 updates the setting information stored in the setting information storage unit 341 using the received setting information, and updates the control program stored in the control program storage unit 342 using the received control program. Then, the usage setting unit 353 updates the printer driver that implements the print control unit 355 by starting (executing) the updated control program (printer driver program). As a result, the terminal device 30 can use the image forming device 20 that the device management apparatus 10 has newly allocated to the terminal device 30.

The print control unit 355 generates print data to transfer the print data to the image forming device 20 that has newly been allocated to the terminal device 30 according to the setting information stored in the setting information storage unit 341 (including the IP address of the image forming device 20, the protocol used when the image forming device 20 performs a print, and the port used when the image forming device 20 performs a print) in order to print the print data.

Next, the operation of the device management system in the first embodiment will be described.

Figure 8:
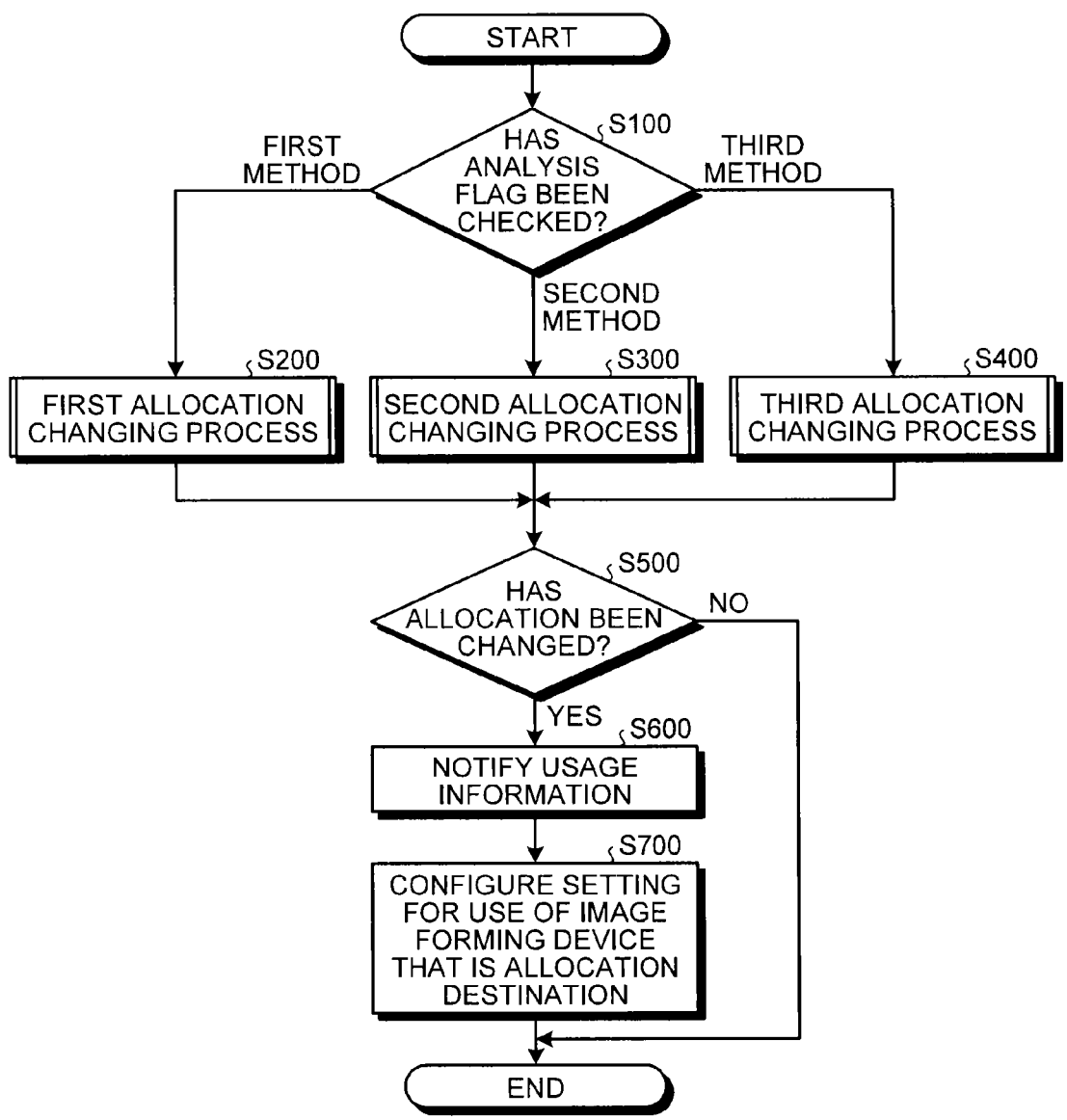
FIG. 8 is a flowchart of an exemplary process performed in the device management system according to the first embodiment.

FIG. 8 is a flowchart of an exemplary process performed in the device management system 1 according to the first embodiment.

The analysis unit 157 first checks the analysis flag stored in the analysis flag storage unit 141 (step S100).

When the analysis flag shows the first analysis method as the analysis method, a first allocation changing process is performed (step S200). When the analysis flag shows the second analysis method as the analysis method, a second allocation changing process is performed (step S300). When the analysis flag shows the third analysis method as the analysis method, a third allocation changing process is performed (step S400).

Figure 9:
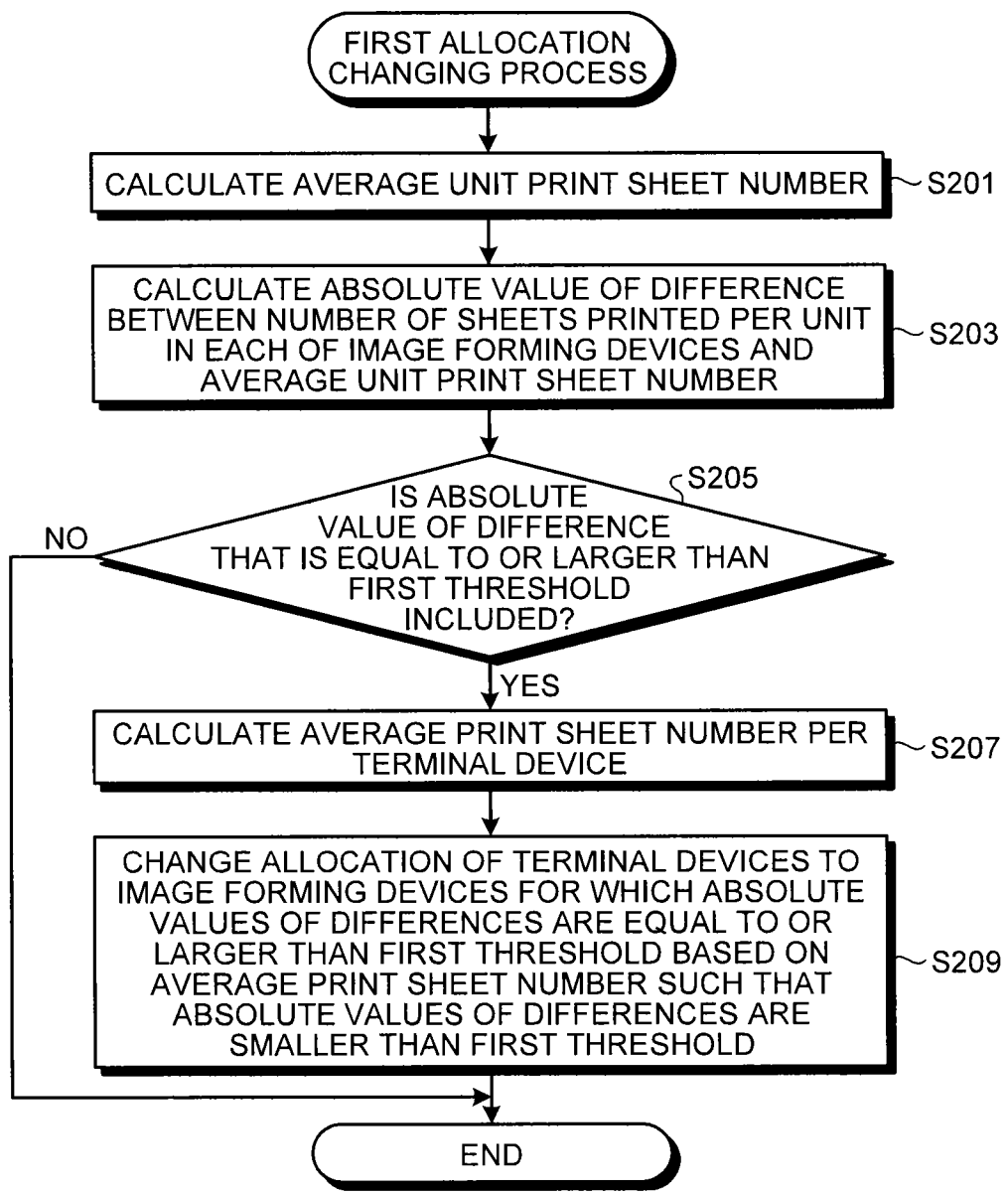
FIG. 9 is a flowchart of an exemplary first allocation changing process performed in the device management system according to the first embodiment.

FIG. 9 is a flowchart of an exemplary first allocation changing process performed in the device management system 1 according to the first embodiment.

The analysis unit 157 first calculates the average unit print sheet number that is the average of the numbers of sheets printed per unit in the image forming devices 20-1 to 20-$m$, using the numbers of sheets printed per unit that are the unit usage amounts of the image forming devices 20-1 to 20-$m$ calculated in the calculation unit 155 (step S201).

The analysis unit 157 subsequently calculates the absolute values of the differences of the numbers of sheets printed per unit in the respective image forming devices 20-1 to 20-$m$ from the average unit print sheet number (step S203).

The determination unit 159 subsequently checks whether the calculated absolute values of the differences include an absolute value of a difference that is equal to or larger than the first threshold (step S205).

Note that, when the calculated absolute values of the differences do not include an absolute value of a difference that is equal to or larger than the first threshold (No in step S205), the determination unit 159 determines that the allocation is not to be changed, and the process is terminated.

On the other hand, when the calculated absolute values of the differences include an absolute value of a difference that is equal to or larger than the first threshold (Yes in step S205), the determination unit 159 determines that the allocation is to be changed, and the change unit 161 calculates the average print sheet number of the terminal devices 30 (step S207). Note that the average print sheet number of the terminal devices 30 can be obtained as the total number of sheets printed per unit in the image forming devices 20-1 to 20-$m$/the number of the terminal devices 30.

The change unit 161 subsequently changes the allocation of terminal devices 30 to the image forming devices 20 for which absolute values of the differences are equal to or larger than the first threshold based on the average print sheet number of the terminal devices 30 such that the absolute values of the differences are smaller than the first threshold (step S209).

Figure 10:
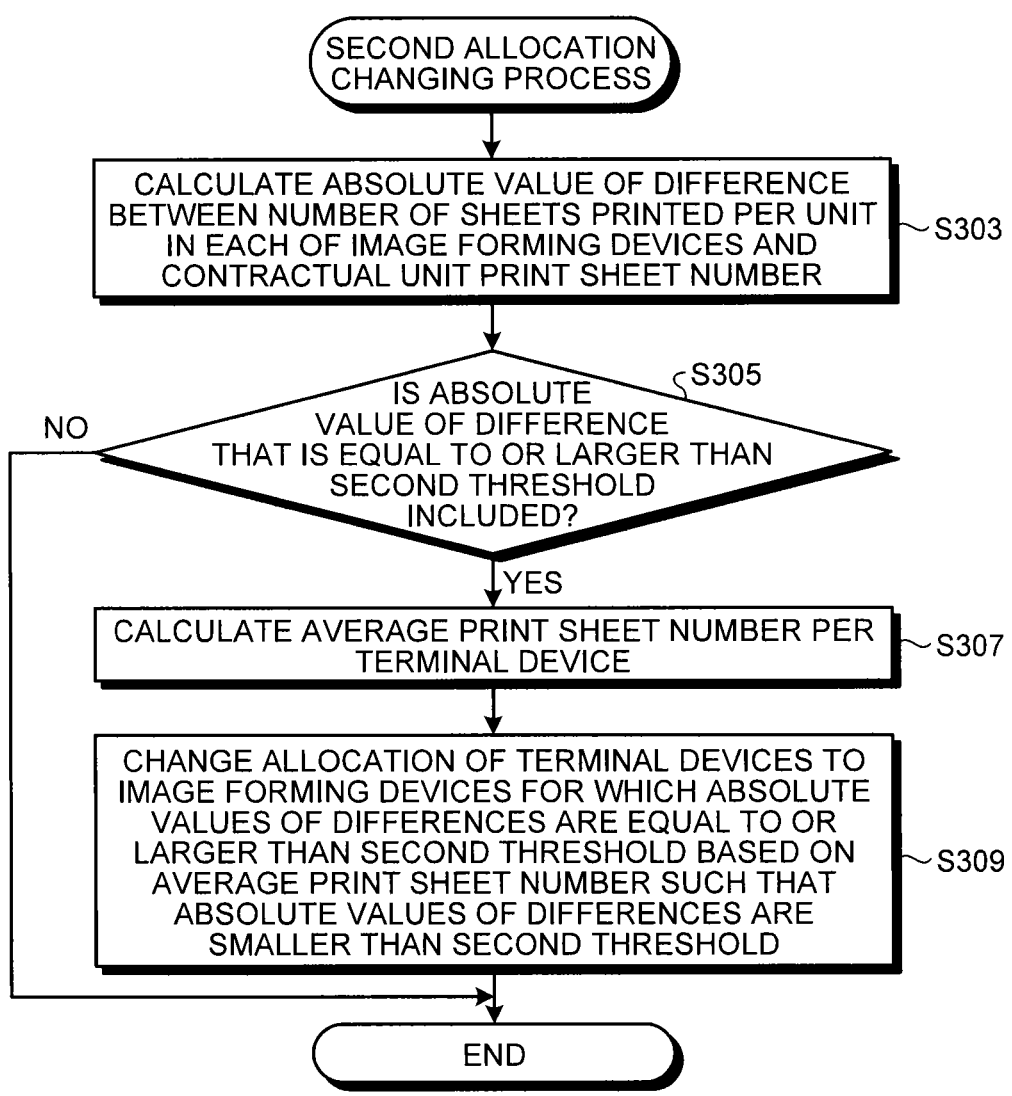
FIG. 10 is a flowchart of an exemplary second allocation changing process performed in the device management system according to the first embodiment.

FIG. 10 is a flowchart of an exemplary second allocation changing process performed in the device management system 1 according to the first embodiment.

The analysis unit 157 first calculates the absolute values of the differences of the numbers of sheets printed per unit from the contractual unit print sheet numbers that are the contractual unit usage amounts for the respective image forming devices 20-1 to 20-$m$ (step S303).

The determination unit 159 subsequently checks whether the calculated absolute values of the differences include an absolute value of a difference that is equal to or larger than the second threshold (step S305).

Note that, when the calculated absolute values of the differences do not include an absolute value of a difference that is equal to or larger than the second threshold (No in step S305), the determination unit 159 determines that the allocation is not to be changed, and the process is terminated.

On the other hand, when the calculated absolute values of the differences include an absolute value of a difference that is equal to or larger than the second threshold (Yes in step S305), the determination unit 159 determines that the allocation is to be changed, and the change unit 161 calculates the average print sheet number of the terminal devices 30 (step S307).

The change unit 161 subsequently changes the allocation of terminal devices 30 to the image forming devices 20 for which absolute values of the differences are equal to or larger than the second threshold based on the average print sheet number of the terminal devices 30 such that the absolute values of the differences are smaller than the second threshold (step S309).

Figure 11:
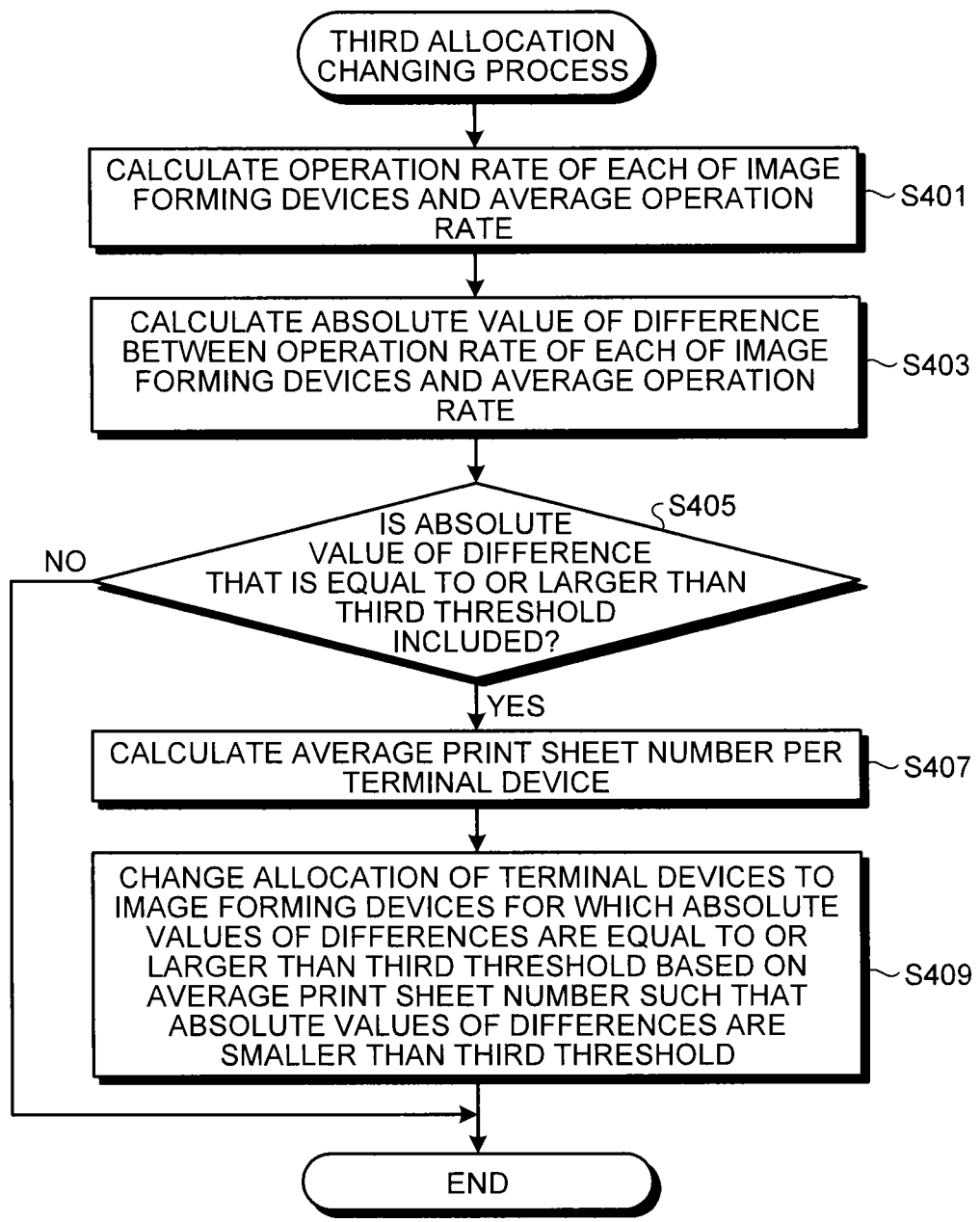
FIG. 11 is a flowchart of an exemplary third allocation changing process performed in the device management system according to the first embodiment.

FIG. 11 is a flowchart of an exemplary third allocation changing process performed in the device management system 1 according to the first embodiment.

The analysis unit 157 first calculates the operation rates of the respective image forming devices 20-1 to 20-$m$ using the numbers of sheets printed per unit that are the unit usage amounts of the image forming devices 20-1 to 20-$m$ calculated in the calculation unit 155 and the performance values of the image forming devices 20-1 to 20-$m$ in order to calculate the average operation rate that is the average of the operation rates of the image forming devices 20-1 to 20-$m$ (step S401).

The analysis unit 157 subsequently calculates the absolute values of the differences of the operation rates of the respective image forming devices 20-1 to 20-$m$ from the average operation rate (step S403).

The determination unit 159 subsequently checks whether the calculated absolute values of the differences include an absolute value of a difference that is equal to or larger than the third threshold (step S405).

Note that, when the calculated absolute values of the differences do not include an absolute value of a difference that is equal to or larger than the third threshold (No in step S405), the determination unit 159 determines that the allocation is not to be changed, and the process is terminated.

On the other hand, when the calculated absolute values of the differences include an absolute value of the difference that is equal to or larger than the third threshold (Yes in step S405), the determination unit 159 determines that the allocation is to be changed, and the change unit 161 calculates the average print sheet number of the terminal devices 30 (step S407).

The change unit 161 subsequently changes the allocation of terminal devices 30 to the image forming devices 20 for which absolute values of the differences are equal to or larger than the third threshold based on the average print sheet number of the terminal devices 30 such that the absolute values of the differences are smaller than the third threshold (step S409).

With reference to FIG. 8 again, when the first allocation changing process (step S200), the second allocation changing process (step S300), or the third allocation changing process (step S400) has been completed, the notification unit 163 checks from the determination result of the determination unit 159 whether the change unit 161 has changed the allocation of the terminal devices 30-1 to 30-n to the image forming devices 20-1 to 20-m (step S500).

Note that, when the allocation of the terminal devices 30-1 to 30-n to the image forming devices 20-1 to 20-m has not been changed (No in step S500), the process is terminated.

On the other hand, when the allocation of the terminal devices 30-1 to 30-n to the image forming devices 20-1 to 20-m has been changed (Yes in step S500), the notification unit 163 notifies the terminal device 30 for which allocation to the image forming device 20 has been changed, of the usage information required to use the image forming device 20 (step S600).

The usage setting unit 353 in the terminal device 30 that has been notified of the usage information subsequently configures the setting for the use of the image forming device 20 that is allocated to its own device (the terminal device 30) based on the usage information notified from the device management apparatus 10 (step S700).

As described above, the use of the image forming devices can be equalized in the first embodiment. This can prevent only some of the image forming devices from being used, can prevent the increase in probability of failures on only some of the image forming devices, and thus can reduce the errors when a terminal device uses the image forming device. Thus, the first embodiment can improve the availability of the whole system. In particular, the first embodiment can provide the above-mentioned effects in an environment in which the terminal device directly uses the image forming device without using a print server or the like to perform a print.

Second Embodiment

An example in which the terminal device sends the device management apparatus an inquiry about the presence or absence of a change of the allocation of an image forming device will be described in the second embodiment. The difference from the first embodiment will mainly be described hereinafter. The same names and reference signs as in the first embodiment will be put on the components having the same functions as in the first embodiment and the descriptions will be omitted.

Figure 12:
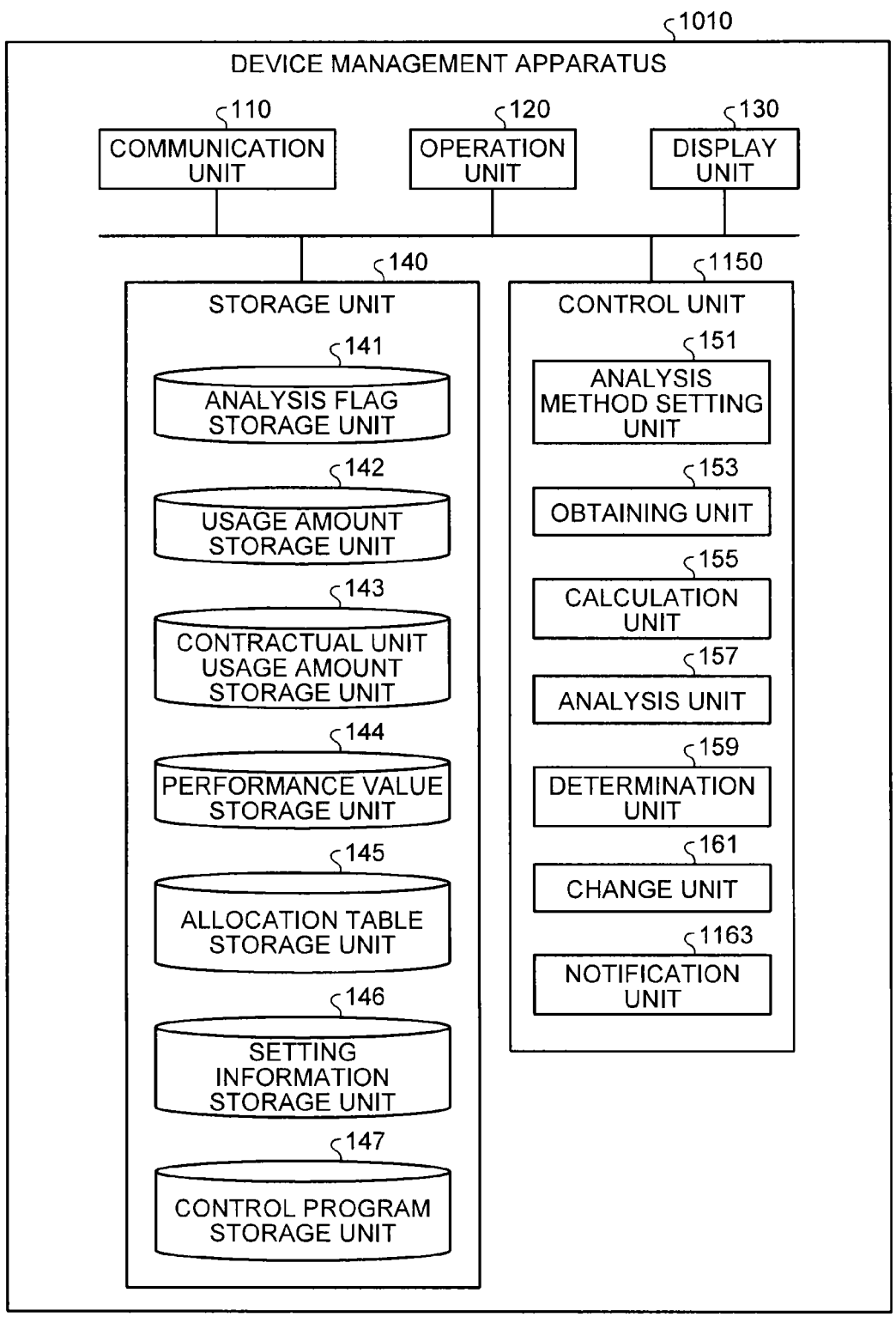
FIG. 12 is a block diagram of an exemplary configuration of a device management apparatus according to a second embodiment.
Figure 13:
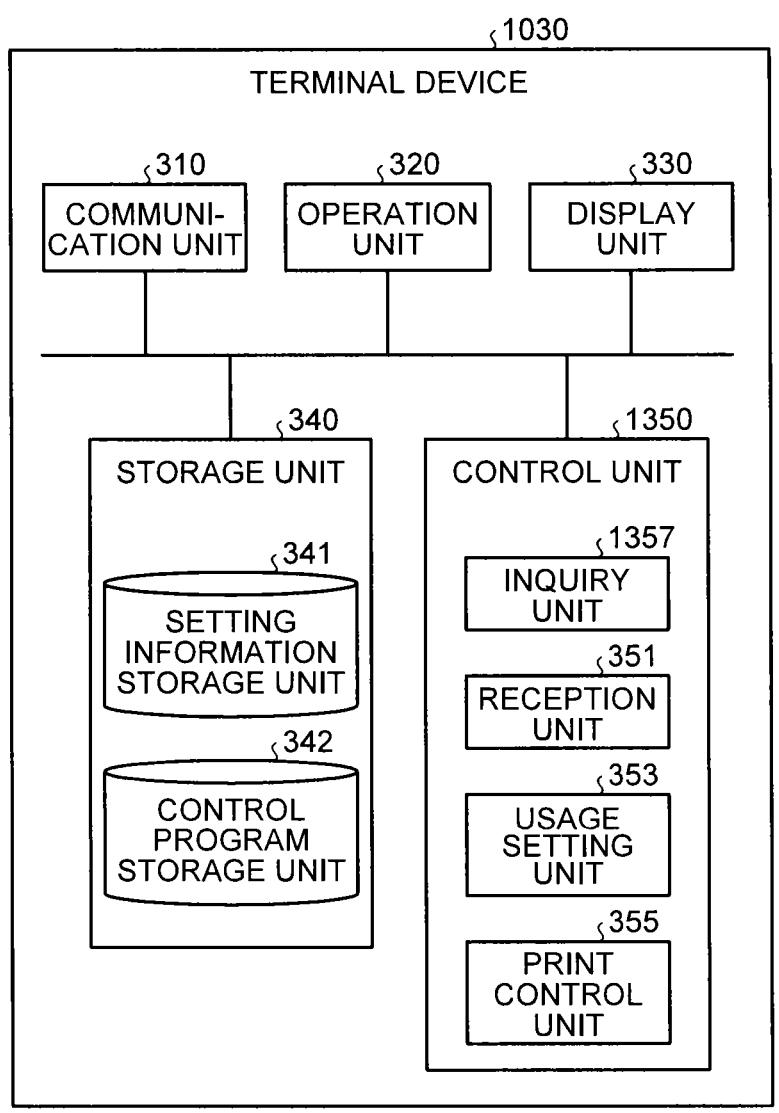
FIG. 13 is a block diagram of an exemplary configuration of a terminal device according to the second embodiment.

FIG. 12 is a block diagram of an exemplary configuration of a device management apparatus 1010 according to the second embodiment. FIG. 13 is a block diagram of an exemplary configuration of a terminal device 1030 according to the second embodiment. As illustrated in FIG. 12, a notification unit 1163 in a control unit 1150 in the device management apparatus 1010 differs from the first embodiment. As illustrated in FIG. 13, an inquiry unit 1357 in a control unit 1350 in the terminal device 1030 differs from the first embodiment.

The inquiry unit 1357 periodically sends the device management apparatus 1010 an inquiry about whether the allocation of its own device (the terminal device 1030) to the image forming devices 20-1 to 20-m has been changed. For example, the inquiry unit 1357 sends an inquiry by periodically transmitting the terminal identification information about its own device (the terminal device 1030) to the device management apparatus 1010.

The notification unit 1163 receives the inquiries about whether the allocation of the terminal devices 1030 to the image forming devices 20-1 to 20-m has been changed from the respective terminal devices 1030. When the image forming device 20 allocated to the terminal device 1030 has been changed, the notification unit 1163 notifies the terminal device 1030 of the usage information.

For example, after receiving the terminal identification information as the inquiry from each of the terminal devices 1030, the notification unit 1163 checks with reference to the allocation table stored in the allocation table storage unit 145 whether the allocation change flag linked to the received terminal identification information shows "one". When the allocation change flag linked to the received terminal identification information shows "one", the notification unit 1163 notifies the terminal device 1030 of the usage information.

Figure 14:
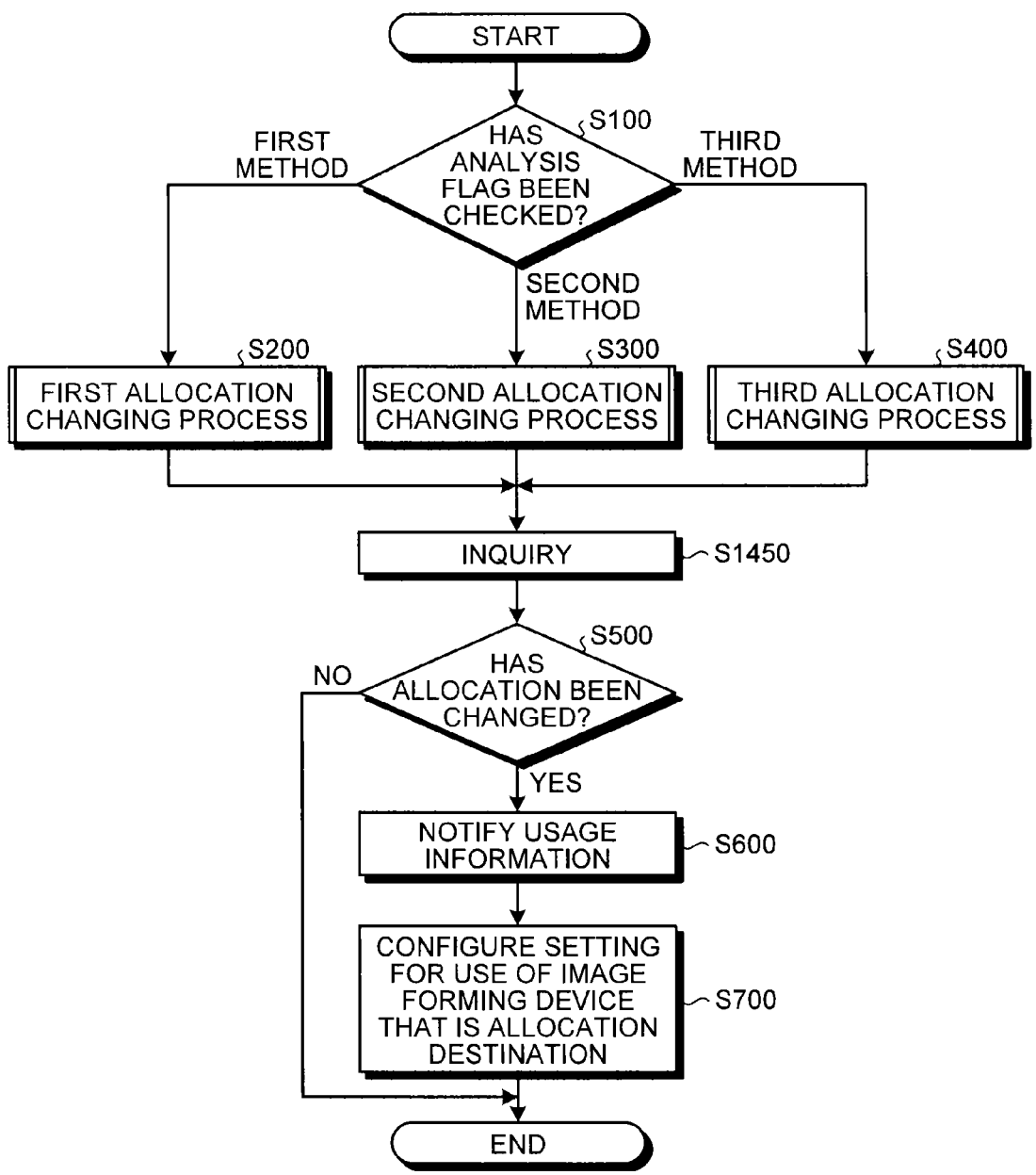
FIG. 14 is a flowchart of an exemplary process performed in a device management system according to the second embodiment.

FIG. 14 is a flowchart of an exemplary process performed in a device management system according to the second embodiment.

First, the processes in step S100 to step S400 are the same as in the flowchart illustrated in FIG. 8.

After the first allocation changing process (step S200), the second allocation changing process (step S300), or the third allocation changing process (step S400) has been completed, the terminal device 1030 sends the device management apparatus 1010 an inquiry about whether the allocation of its own device (the terminal device 1030) to the image forming devices 20-1 to 20-m has been changed (step S1450).

When receiving the inquiry from the terminal device 1030, the notification unit 1163 subsequently checks whether the allocation of the terminal device 1030 to the image forming devices 20-1 to 20-m has been changed (step S500).

The processes in step S600 to step S700 are the same as in the flowchart illustrated in FIG. 8.

Exemplary Variations

Note that the present invention is not limited to each of the embodiments, and can variously be changed.

Hardware Configuration

Figure 15:
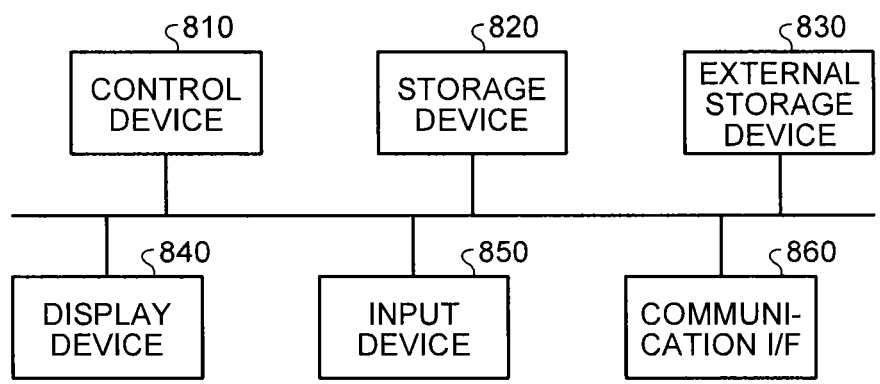
FIG. 15 is a diagram of an exemplary hardware configuration of each of the device management apparatus and the terminal device in the first and second embodiments.

FIG. 15 is a diagram of an exemplary hardware configuration of each of the device management apparatus and the terminal device in each of the embodiments. Each of the device management apparatus and the terminal device in each of the embodiments includes a control device 810 such as a CPU, a storage device 820 such as a ROM or a RAM, an external storage device 830 such as an HDD, a display device 840 such as a display, an input device 850 such as a keyboard or a mouse, and a communication interface 860. The hardware configuration uses an ordinary computer.

The programs executed in the device management apparatus and the terminal device in each of the embodiments are provided by being stored in a computer-readable storage medium such as a CD-ROM, a CD-R, a memory card, a digital versatile disk (DVD), or a flexible disk (FD) in an installable format or in an executable format.

The programs executed in the device management apparatus and the terminal device in each of the embodiments may be stored on the computer connected to a network such as the Internet in such a way as to be downloaded through the network. The programs executed in the device management apparatus and the terminal device in each of the embodiments may be provided or distributed through a network such as the Internet. The programs executed in the device management apparatus and the terminal device in each of the embodiments may be provided by being embedded in a ROM or the like in advance.

The programs executed in the device management apparatus and the terminal device in each of the embodiments have a module configuration to implement each of the units on the computer. As actual hardware, the CPU reads the program from the HDD onto the RAM and executes the program. This implements the components on the computer.

The embodiment provides the effect of improving the availability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management apparatus connected to a plurality of devices and a plurality of information processing apparatuses using the devices, through a network, the device management apparatus comprising:
   circuitry configured to
      obtain usage amount information about usage amounts from the plurality of devices,
      calculate unit usage amounts that are usage amounts of the plurality of devices per unit period, using the usage amount information about the plurality of devices,
      select, based on a set flag, an analysis method from a plurality of analysis methods, the plurality of analysis methods being based on an operation of the plurality of devices,
      analyze, using the selected analysis method, use of the plurality of devices using the unit usage amounts of the plurality of devices,
      change allocation of the plurality of information processing apparatuses to the plurality of devices based on an analysis result, in order to equalize use of the plurality of devices, and
      notify an information processing apparatus for which an allocated device has been changed, of usage information required to use a newly allocated device,
   wherein an allocation of the plurality of information processing apparatuses based on a first analysis method is different from an allocation of the plurality of information processing apparatuses based on a second analysis method, and wherein an allocation of the plurality of information processing apparatuses based on a third analysis method is different from an allocation of the plurality of information processes apparatuses based on the first analysis method and the second analysis method.

2. The device management apparatus according to claim 1, wherein the circuitry is further configured to notify an information processing apparatus for which an allocated device has been changed, of the usage information based on a fact that the allocation of the information processing apparatuses to the plurality of devices has been changed.

3. The device management apparatus according to claim 1, wherein the circuitry is further configured to receive inquires about whether allocation of the plurality of information processing apparatuses to the plurality of devices has been changed, from the plurality of information processing apparatus and notify an information processing apparatus of the usage information when a device allocated to the information processing apparatus has been changed.

4. The device management apparatus according to claim 1, wherein, when a type of the newly allocated device allocated to an information processing apparatus is identical to a type of a device before allocation change, the circuitry is further configured to notify the information processing apparatus of setting information about a setting of the newly allocated device as the usage information.

5. The device management apparatus according to claim 1, wherein, when a type of the newly allocated device allocated to an information processing apparatus is different from a type of a device before allocation change, the circuitry is further configured to notify the information processing apparatus of setting information about a setting of the newly allocate device and a control program to control the device as the usage information.

6. The device management apparatus according to claim 1, wherein the circuitry is further configured to
   determined whether to change the allocation of the plurality of information processing apparatuses to the plurality of devices based on the analysis result, and
   when it has been determined to change the allocation of the plurality of information processing apparatuses to the plurality of devices, change the allocation of the plurality of information processing apparatuses to the devices based on the analysis result in order to equalize use of the devices.

7. The device management apparatus according to claim 6, wherein the circuitry is further configured to
   calculate an average unit usage amount based on a selected analysis method using the average unit usage amount that is an average of the unit usage amounts of the plurality of devices in order to calculate absolute values of a differences of unit usage amounts of the plurality of devices from the average unit usage amount,
   determine that the allocation of the plurality of information processing apparatuses to the plurality of devices is to be changed when at least one of the absolute values of the differences for the devices is equal to or larger than a first threshold, and
   change the allocation of the plurality of information processing apparatuses to the plurality of devices such that all the absolute values of the differences for the plurality of devices are smaller than the first threshold when it has been determined to change the allocation of the plurality of information processing apparatuses to the devices.

8. The device management apparatus according to claim 7, wherein the circuitry is further configured to reduces a number of information processing apparatuses allocated to a device for which an absolute value of a difference is equal to or larger than the first threshold and for which a unit usage amount is larger than the average unit usage amount, and increases a number of information processing apparatuses allocated to a device for which an absolute value of a difference is equal to or larger than the first threshold and for which a unit usage amount is smaller than the average unit usage amount.

9. The device management apparatus according to claim 6, wherein the circuitry is further configured to
   calculates, based on an selected analysis method using contractual unit usage amounts that are usage amounts per unit period determined in a contract for the plurality of devices, absolute values of differences of unit usage amounts from the contractual unit usage amounts of the plurality of devices,
   determine that the allocation of the plurality of the information processing apparatuses the plurality of devices is to be changed when at least one of the absolute values of the differences for the plurality of devices is equal to or larger than a second threshold, and
   change the allocation of the plurality of information processing apparatuses to the plurality of devices such that all the absolute values of the differences are smaller than the second threshold when it has been determined to change the allocation of the plurality of information processing apparatuses to the plurality of devices.

10. The device management apparatus according to claim 9, wherein the circuitry is further configured to reduce number of information processing apparatuses allocated to a device for which an absolute value of a difference is equal to or larger than the second threshold and for which a unit usage amount is larger than the contractual unit usage amount, and increases a number of information processing apparatuses allocated to a device for which an absolute value of a difference is equal to or larger than the second threshold and for which a unit usage amount is smaller than the contractual unit usage amount.

11. The device management apparatus according to claim 6, wherein the circuitry is further configured to
calculates, based on a selected analysis method using an average operation rate that is an average of operation rates of the devices, the operation rates of the plurality of devices and the average operation rate using performance values and the unit usage amounts of the plurality of devices in order to calculate absolute values of differences of the operation rates of the plurality of devices from the average operation rate,
determine that the allocation of the plurality of information processing apparatuses to the plurality of devices is to be changed when at least one of the absolute values of the differences for the plurality of devices is equal to or larger than a third threshold, and
change the allocation of the plurality of information processing apparatuses to the plurality of devices such that all the absolute values of the differences are smaller than the second threshold when it has been determined to change the allocation of the plurality of information processing apparatuses to the plurality of devices.

12. The device management apparatus according to claim 11, wherein the circuitry is further configured to reduce a number of information processing apparatuses allocated to a device for which an absolute value of a difference is equal to or larger than the third threshold and for which operation rate is higher than the average operation rate, and increases number of information processing apparatuses allocated to a device for which an absolute value of a difference is equal to or larger than the third threshold and for which an operation rate is lower than the average operation rate.

13. A device management system comprising:
a plurality of devices;
a plurality of information processing apparatuses using the plurality of devices; and
a device management apparatus connected to the plurality of devices and the plurality of information processing apparatuses through a network, wherein
the device management apparatus includes circuitry configured to
obtain usage amount information about usage amounts from the plurality of devices,
calculate unit usage amounts that are usage amounts of the plurality of devices per unit period, using the usage amount information about the plurality of devices,
select, based on a set flag, an analysis method from a plurality of analysis methods, the plurality of analysis methods being based on an operation of the plurality of devices,
analyze, using the selected analysis method, use of the plurality of devices using the unit usage amounts of the plurality of devices,
change allocation of the plurality of information processing apparatuses to the plurality of devices based on an analysis result, in order to equalize use of the plurality of devices, and
notify an information processing apparatus for which an allocated device has been changed, of usage information required to use a newly allocated device,
wherein each of the plurality of information processing apparatuses includes usage setting circuitry that configures a setting for use of a newly allocated device based on the notified usage information, and
wherein an allocation of the plurality of information processing apparatuses based on a first analysis method is different from an allocation of the plurality of information processing apparatuses based on a second analysis method, and wherein an allocation of the plurality of information processing apparatuses based on a third analysis method is different from an allocation of the plurality of information processes apparatuses based on the first analysis method and the second analysis method.

14. The device management system according to claim 13, wherein the circuitry is further configured to notify an information processing apparatus for which an allocated device has been changed, of the usage information based on a fact that the allocation of the information processing apparatuses to the devices has been changed.

15. The device management system according to claim 13, wherein each of the plurality of information processing apparatuses further includes inquiry circuitry that periodically sends the device management apparatus an inquiry about whether allocation of that information processing apparatus to the plurality of devices has been changed, and
wherein the circuitry is further configured to receive inquiries about whether allocation of the plurality of information processing apparatuses to the plurality of devices has been changed from the plurality of information processing apparatuses and, when a device allocated to an information processing apparatus has been changed, notifies the information processing apparatus of the usage information.

16. The device management system according to claim 13, wherein, when a type of the newly allocated device allocated to an information processing apparatus is identical to a type before allocation change, the circuitry is configured to notify the notification processing apparatus of setting information about a setting of the newly allocated device as the usage information.

17. The device management system according to claim 13, wherein, when a type of a device allocated to an information processing apparatus is different from a type before the allocation change, the circuitry is configured to notify the notification processing apparatus of setting information about a setting of the device and a control program to control the device as the usage information.

18. A device management method performed in a device management system, the device management method comprising:
obtaining usage amount information about usage amounts from a plurality of devices;
calculating unit usage amounts that are usage amounts of the plurality of devices per unit period, using the usage amount information about the plurality of devices;
selecting, based on a set flag, an analysis method from a plurality of analysis methods, the plurality of analysis methods being based on an operation of the plurality of devices, analyzing, using the selected analysis method, use of the plurality of devices using the unit usage amounts of the plurality of devices;

changing allocation of plurality of information processing apparatuses to the plurality of devices based on an analysis result, in order to equalize use of the plurality of devices;

notifying an information processing apparatus for which an allocated device has been changed, of usage information required to use a newly allocated device; and configuring a setting for use of the newly allocated device based on the notified usage information, an allocation of the plurality of information processing apparatuses based on a first analysis method being different from an allocation of the plurality of information processing apparatuses based on a second analysis method, and an allocation of the plurality of information processing apparatuses based on a third analysis method being different from an allocation of the plurality of information processes apparatuses based on the first analysis method and the second analysis method.

19. The device management apparatus according to claim 1, wherein the analysis result is reflective of the selected analysis method.

* * * * *